Aug. 27, 1940.    J. S. PEAKE ET AL    2,213,170
METHOD OF PRODUCING METALS, SUCH AS CALCIUM AND MAGNESIUM
Filed Aug. 3, 1939
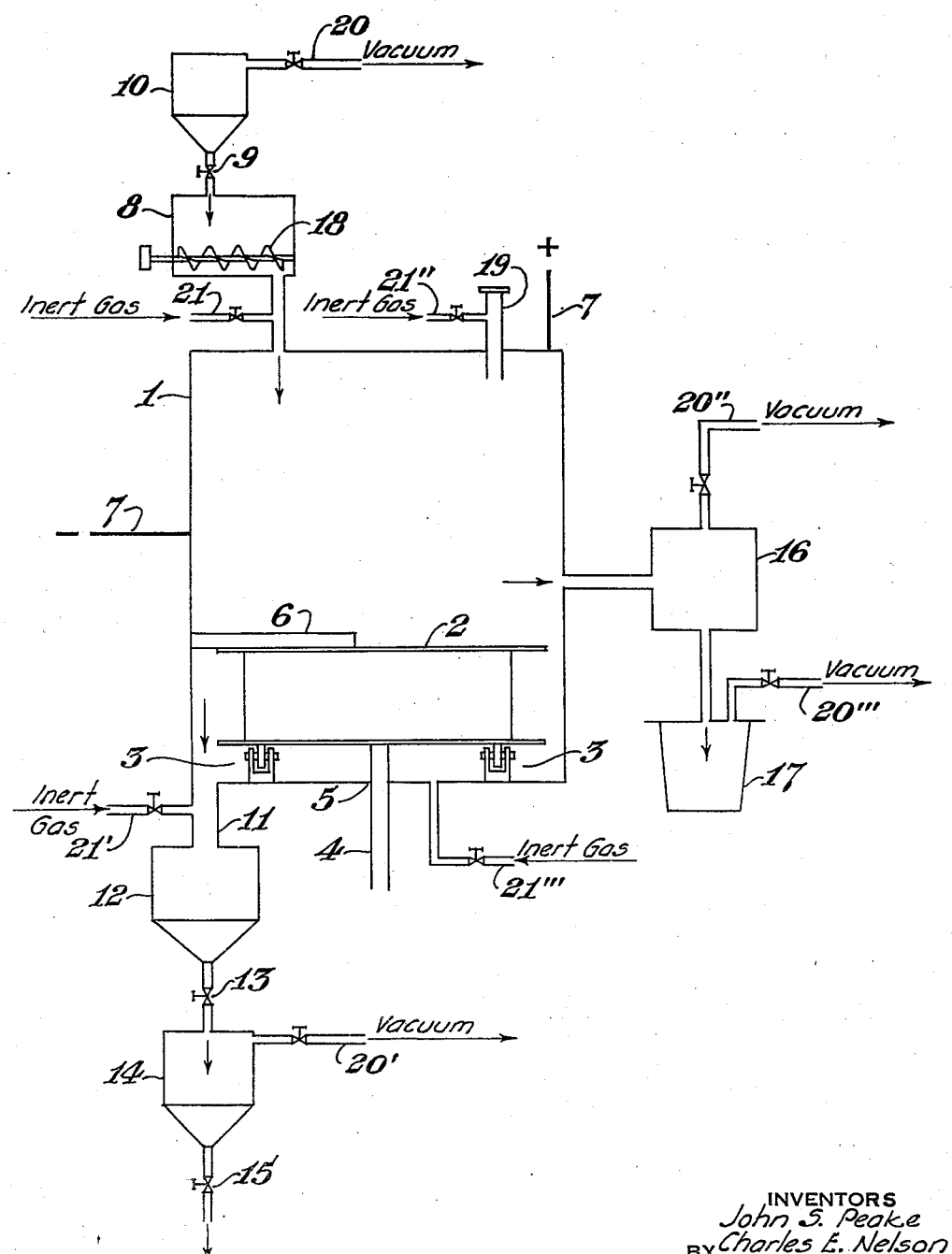
INVENTORS
John S. Peake
Charles E. Nelson
BY Griswold & Burdick
ATTORNEYS

UNITED STATES PATENT OFFICE 2,213,170

METHOD OF PRODUCING METALS, SUCH AS CALCIUM AND MAGNESIUM

John S. Peake and Charles E. Nelson, Midland, Mich., assignors to The Dow Chemical Company, Midland, Mich., a corporation of Michigan Application August 3, 1939, Serial No. 288,090

8 Claims. (Cl. 75—67)

The invention relates to methods of producing an alkaline earth metal such as magnesium, calcium, or like readily oxidizable metals from metal-containing charge materials. It more particularly concerns an improved method wherein alkaline earth metal-containing charge materials may be subjected to thermal reduction or dissociation, as the case may be, under a reduced pressure liberating the metal as a vapor which is subsequently condensed.

It has been proposed to produce magnesium, for example, by the thermal reduction under reduced pressure of magnesium oxide-containing materials, such as calcined dolomite, employing a reducing agent, such as ferro-silicon, aluminum, calcium carbide, carbon, and the like. It has also been proposed to produce calcium by the thermal dissociation of calcium carbide under highly reduced pressure.

However, the commercial operation of these processes is attended by difficulties which render them unsatisfactory in practical operation. For example, if an attempt is made to carry out the reaction continuously on a commercial scale wherein a fresh charge of raw material is to be introduced either continuously or intermittently into the furnace and the reaction residue removed therefrom in the same manner either as a fused slag, solid residue, or as a mixture thereof such as a paste-like material, the metal vapor liberated escapes through passages necessarily provided for the introduction of the charge and removal of the residue, rendering the process unsatisfactory because some of the product escapes through the passages, while a portion of it condenses in the passages, plugging them so that it is impossible to either introduce the charge or remove the residue. In addition, the metal vapor condenses in other passages communicating with the furnace chamber. Even in carrying out the method as a batch operation similar difficulty is encountered since a suitable furnace is usually equipped with sight glasses or other passages into which the metal vapor flows and condenses thereby causing difficulty as regards satisfactory operation of the process.

By the term "passages" used herein and in the appended claims is meant any opening other than the passage leading from the reaction chamber to the condenser, communicating with the reaction chamber which is of substantially smaller cross-sectional area than that of the reaction chamber into which the metal vapor may diffuse or otherwise flow and due to cooling condense. Examples of such passages ordinarily provided in the apparatus employed for carrying out reactions such as those above-mentioned are sight glass tubes provided for observing the course of the reaction and for making a temperature measurement by means of an optical pyrometer, the openings around shafts which serve as means of actuating agitators, conveyors, and the like, the openings between moving members within the reaction chamber, such as the opening between the inner walls of the furnace and the edge of a rotating hearth or table, as well as the feed inlet and residue outlet openings.

It is, therefore, the principal object of the invention to provide a method whereby metal-containing charge materials may be thermally reduced or dissociated under a high vacuum without the attendant difficulty of the metal vapor produced condensing in various passages communicating with the reaction chamber.

Other objects and advantages will be apparent during the course of the following description.

We have discovered that by continuously introducing a small amount of gas, preferably inert to the metal vapor, the amount being so small as to still enable holding the furnace under highly reduced pressure, into the passages in communication with the reaction chamber of the furnace, so as to cause the gas to flow toward the interior of the furnace, the metal vapor is prevented from escaping through these passages and the reaction can be rapidly effected.

The invention, then, consists of the method hereinafter fully described and particularly pointed out in the claims, the accompanying drawing forming a part of this specification showing diagrammatically an apparatus suitable for carrying out the method of the invention.

In the drawing, electric furnace 1 of resistor or other suitable type is provided with a circular rotating hearth or table 2 mounted on rollers 3 and driven by shaft 4, which is connected to a suitable source of power (not shown) and to the table 2 through a stuffing box (not shown) at 5. A rake or plow 6 is shown attached to the furnace wall and projects over the rotating table 2 and acts to sweep the reacted charge from the table as the table is turned during the operation of the process. The furnace is shown provided with electrical leads 7 which serve as a means whereby current is supplied to the furnace to heat the charge to reaction temperature. The furnace communicates at one end with feed chamber 8 which in turn communicates through air lock or valve 9 with charging chamber 10. At the other end of the furnace a suitable outlet 11 connects the furnace with a residue collecting chamber 12 disposed in series and communicating through an air lock or valve 13 with a second residue collecting chamber 14. Chamber 14 is provided with an outlet which may be sealed by means of air lock or valve 15. The furnace is also provided with a condenser 16 which discharges into a suitable receiver 17. The feed chamber 8 is provided with a suitable conveyer, such as screw 18 or the like to serve as a means of positively and continuously introducing the charge onto the rotating table. The furnace is also shown provided with a sight glass 19 which serves as a means whereby optical pyrometrical temperature measurements may be made during the course of the reaction. Chambers 10 and 14, condenser 16 and receiver 17 are provided with valved connections 20, 20', 20" and 20'" in respective order to a source of reduced pressure or vacuum (not shown), while valved gas inlet connections 21, 21', 21" and 21'" communicate with, respectively, the feed inlet passage, residue outlet passage, sight glass tube, and the passageway around the rotating hearth.

In the operation of the apparatus wherein a charge, e. g. of calcined dolomite admixed with ferro-silicon is to be heated to liberate magnesium, the charge is placed in charging chamber 10, which is then sealed up and a vacuum applied through vacuum connection 20. In the meantime furnace 1 and the chambers 8, 12, 16 and 17 are likewise evacuated to the desired degree, air locks 9 and 13 being closed. When chamber 10 has been evacuated to about the same degree as the furnace chamber, air lock 9 is opened and the charge is allowed to flow into feed chamber 8. After the charging chamber 10 has emptied into feed chamber 8, air lock 9 is closed, the vacuum on chamber 10 is broken, and the chamber refilled preparatory to introducing another charge into the feed chamber in the manner just described. The charge entering the chamber 8 is fed, preferably at a constant rate, into furnace 1 by means of conveyor 18. The charge entering the furnace drops on the rotating hearth or table 2 ahead of plow 6. The table is rotated at a rate suitable to allow the reaction to complete itself during the time the hearth makes one complete rotation. The plow 6 then sweeps the residue off the table and causes it to drop into the collecting chamber 12 through discharge passage 11. When the collector 12 is full of the discharge residue, chamber 14 is evacuated through connection 20' to the same degree as the remainder of the system, valve 13 being in the closed position. Valve 13 is then opened and the residue allowed to pass into chamber 14. After chamber 12 is thus emptied, valve 13 is closed, the vacuum disconnected at 20', and valve 15 opened to discharge the residue from the chamber 14.

At the same time the charge is being fed into the furnace, a relatively small amount of gas, preferably inert to the metal vapor, is admitted into the system through the inlets 21, 21', 21", and 21'". This stream of gas, constantly flowing through the feed inlet and residue discharge outlet, as well as through the sight glass 19 and around the rotating hearth, acts to block or prevent the metal vapor formed by the reaction from flowing into and condensing in the system at these points. At the highly reduced pressure under which the process is operated, the magnesium vapor formed by the termal dissociation of the magnesium oxide-containing materials condenses in condenser 16, from which it may be discharged as molten magnesium into receiver 17. When receiver 17 is filled, the condenser and outlet line connecting the condenser and receiver are allowed to cool until the metal solidifies or freezes in the line, thus sealing the receiver from the condenser. The receiver 17 is then detached from the condenser and after the metal has been removed therefrom, it may be reattached preparatory to removing more molten metal from the condenser.

We have found that the amount of gas flowing in a direction toward the interior of the furnace required to prevent the escape of metal vapor into the aforesaid passages is between about 0.35 and 2.0 liters, and preferably between about 0.5 and 1.0 liter at standard conditions of temperature and pressure, per hour per square centimeter of crosss-sectional area of said passages. Employing an amount of gas such as that above mentioned, reduced pressures of below 10 millimeters of mercury may be readily maintained, allowing the thermal reduction of magnesium oxide-containing material or the thermal dissociation of calcium carbide, as the case may be, to be rapidly and completely effected. While the volume of gas employed according to our invention is so small in amount as to be incapable of either directing the flow of metal vapor through the reaction chamber of the furnace, which is of relatively large cross-sectional area relative to the area of the passages so as to carry the vapor from the furnace, or of increasing the rate of reaction, it does act to block or prevent the vapors from flowing into the passages, such as those aforementioned.

Although it is preferable to employ a gas which is inert or substantially so in the presence of the calcium or magnesium metal vapor such as, for example, helium, argon, and the like, if desired air, oxygen, or other reactive gases may be suitably employed, since the amount required is so small as to exert but very little deleterious effect upon the reaction as regards converting any appreciable amount of the metal vapor into undesirable end products.

In those instances where the reaction being carried out is the production of magnesium by thermal reduction of a magnesium-containing charge material, any of the well-known reducing agents, e. g. ferro-silicon, calcium carbide, aluminum, calcium, and carbon, may be suitably employed in carrying out the method, although when operating at highly reduced pressures it is preferable to employ a reducing agent which does not form a gaseous reaction product, such as, for example, ferro-silicon, since a high vacuum is much more readily maintained when such a reducing agent is employed. In carrying out the thermal reduction of a magnesium-containing material the most suitable temperature to employ is from between about 1100° to 1400° C.

In the production of calcium by the thermal dissociation of calcium carbide, the charge preferably consists entirely of calcium carbide which should be heated to a temperature of between about 1600° to 1800° C. to bring about satisfactory dissociation.

As aforementioned, it is desirable to carry out the reaction at highly reduced pressures, preferably below 10 millimeters of mercury pressure, although, if desired, the operation may be satisfactorily carried out at pressures up to about 35 millimeters of mercury pressure.

In the foregoing manner, metals such as magnesium or calcium can be produced from metal-containing charge materials in a furnace held under a high vacuum by a method adapted to either continuous or batch operation. In addition, the metal produced is of a high purity in the form of large compact crystals uncontaminated by reaction residue, since the volume of inert gas employed in carrying out the method of the invention is so small in amount as to be incapable of carrying the residue from the furnace and depositing it with the condensed metals. Instead it permits the residue to settle out in the furnace as the reaction proceeds, and is thus separately removable therefrom.

This application is a continuation-in-part application of our co-pending applications Serial Nos. 228,095 and 228,096, filed September 2, 1938.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method of producing metals such as calcium and magnesium, wherein the metal is liberated as a vapor from a heated metal-containing charge material in a furnace held under a pressure below about 35 millimeters of mercury, said furnace having a passage of a substantially smaller cross-sectional area than the cross-sectional area of the furnace, said passage being in communication with the interior of the furnace, the step which consists in introducing into the passage a gas in an amount sufficient to block the flow of vapor in said passage, but insufficient to direct the flow of metal vapor through the furnace.

2. In a method of producing metals such as calcium and magnesium, wherein the metal is liberated as a vapor from a heated metal-containing charge material in a furnace held under a pressure below about 35 millimeters of mercury, said furnace having passages of substantially smaller cross-sectional area than the cross-sectional area of the furnace, said passages being in communication with the interior of the furnace, the step which consists in introducing into any of the passages in which it is desired to prevent the condensation of the metal vapor a gas in amount sufficient to block the flow of vapor in said passages, but insufficient to direct the flow of metal vapor through the furnace.

3. In a method of producing magnesium metal by heating a magnesium oxide-containing material in the presence of a reducing agent capable of liberating magnesium at a temperature between about 1100° to 1400° C. under a pressure below about 20 millimeters of mercury, wherein the charge of magnesium oxide-containing material and reducing agent is continuously fed through a feed passage into a furnace and the resulting reaction residue removed therefrom through a discharge passage, said feed and discharge passages being of a substantially smaller cross-sectional area than the cross-sectional area of the furnace, the step which consists in introducing a gas into said passages in an amount sufficient to block the flow of magnesium vapor in the feed and discharge passages, but insufficient to direct the flow of magnesium vapor through the furnace.

4. In a method of producing magnesium metal by heating a magnesium oxide-containing material in the presence of a reducing agent selected from the group consisting of silicon, aluminum, and calcium at a temperature between about 1100° to 1400° C. under a pressure below about 20 millimeters of mercury, wherein the charge of magnesium oxide-containing material and reducing agent is continuously fed through a feed passage into a furnace and the resulting reaction residue removed therefrom through a discharge passage, said feed and discharge passages being of a substantially smaller cross-sectional area than the cross-sectional area of the furnace, the step which consists in introducing an inert gas into said passages in an amount sufficient to block the flow of magnesium vapor in the feed and discharge passages, but insufficient to direct the flow of magnesium vapor through the furnace.

5. In a method of producing magnesium metal by heating a magnesium oxide-containing material in the presence of a reducing agent comprising silicon at a temperature between about 1100° to 1400° C. under a pressure below about 20 millimeters of mercury, wherein the charge of magnesium oxide-containing material and reducing agent is fed through a feed passage into a furnace and the resulting reaction residue removed therefrom through a discharge passage, said feed and discharge passages being of a substantially smaller cross-sectional area than the cross-sectional area of the furnace, the step which consists in introducing an inert gas into the feed and discharge passages, respectively, in an amount of from 0.35 to 2.0 liters per hour per square centimeter of cross-sectional area of said passages.

6. In a method of producing magnesium metal by heating a magnesium oxide-containing material in the presence of a reducing agent selected from the group consisting of silicon, aluminum, and calcium at a temperature between about 1100° to 1400° C. under a pressure below about 10 millimeters of mercury, wherein the charge of magnesium oxide-containing material and reducing agent is continuously fed through a feed passage into a furnace and the resulting reaction residue removed therefrom through a discharge passage, said feed and discharge passages being of a substantially smaller cross-sectional area than the cross-sectional area of the furnace, the step which consists in introducing an inert gas into the feed and discharge passages, respectively, in an amount of from 0.5 to 1.0 liter per hour per square centimeter of cross-sectional area of said passages.

7. In a method of producing calcium metal by thermally dissociating calcium carbide at a temperature between about 1600°–1800° C. under a pressure below 20 millimeters of mercury, wherein the calcium carbide to be dissociated is fed through a feed passage into a furnace and the resulting reaction residue removed therefrom through a discharge passage, said feed and discharge passages being of a substantially smaller cross-sectional area than the cross-sectional area of the furnace, the step which consists in introducing a gas into the feed and discharge passages, respectively, in an amount of from 0.35 to 2.0 liters per hour per square centimeter of cross-sectional area of said passages.

8. In a method of producing calcium metal by thermally dissociating calcium carbide at a temperature between about 1600°–1800° C. under a pressure below 10 millimeters of mercury, wherein the calcium carbide to be dissociated is continuously fed through a feed passage into a furnace and the resulting reaction residue removed through a discharge passage, said feed and discharge passages being of a substantially smaller cross-sectional area than the cross-sectional area of the furnace, the step which consists in introducing an inert gas into the feed and discharge passages, respectively, in an amount of from 0.5 to 1.0 liter per hour per square centimeter of cross-sectional area of said passages.

JOHN S. PEAKE.
CHARLES E. NELSON.